(12) United States Patent
Karaoguz et al.

(10) Patent No.: US 9,014,196 B2
(45) Date of Patent: Apr. 21, 2015

(54) SYSTEM AND METHOD FOR PROVIDING A SUPER CHANNEL IN A MULTI-BAND MULTI-PROTOCOL HYBRID WIRED/WIRELESS NETWORK

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2930 days.

(21) Appl. No.: 10/658,161

(22) Filed: Sep. 9, 2003

(65) Prior Publication Data

US 2004/0052273 A1    Mar. 18, 2004

Related U.S. Application Data

(60) Provisional application No. 60/433,198, filed on Dec. 13, 2002, provisional application No. 60/411,261, filed on Sep. 17, 2002, provisional application No. 60/411,301, filed on Sep. 17, 2002.

(51) Int. Cl.
*H04L 12/28* (2006.01)
*G01S 5/02* (2010.01)
(Continued)

(52) U.S. Cl.
CPC ............ *G01S 5/0252* (2013.01); *H04L 12/2856* (2013.01); *H04L 12/2876* (2013.01);
(Continued)

(58) Field of Classification Search
CPC .............................. H04L 45/16; H04L 45/245
USPC .......................................... 370/433, 465, 466
See application file for complete search history.

(56) References Cited

U.S. PATENT DOCUMENTS 5,521,910 A * 5/1996 Matthews ...................... 370/256
5,630,061 A * 5/1997 Richter et al. ................. 709/227
(Continued)

FOREIGN PATENT DOCUMENTS

| CN | 1186581 | 7/1998 |
|----|---------|--------|
| WO | 00/14933 | 3/2000 |

(Continued)

OTHER PUBLICATIONS

European Search Report corresponding to European Patent Application No. 04012806.8-1249, dated Feb. 9, 2010.

(Continued)

*Primary Examiner* — Wanda Z Russell
(74) *Attorney, Agent, or Firm* — Oblon, McClelland, Maier & Neustadt, L.L.P.

(57) ABSTRACT

Messages from a physical layer of each communication band and communication channel associated with each protocol utilized in a multi-band, multi-protocol network may be aggregated into a single multi-protocol layer called, for example, a super channel layer. An optimal communication path may be identified from among the communication bands and/or communication channels based on information borne by the single multi-protocol layer. A communication session may be established via optimal communication path. The communication path may include different channels within a single communication bands, and/or channels selected from different communication bands. In this regard, channels from the same or different communication bands may be combined to provide an optimal communication path. The single multi-protocol layer may be characterized as a sublayer located within the data link layer. Accordingly, the single multi-protocol layer may be located above a MAC layer, both of which are part of the data link layer.

42 Claims, 9 Drawing Sheets

(51) Int. Cl.
*H04L 12/54* (2013.01)
*H04L 12/24* (2006.01)
*H04L 12/803* (2013.01)
*H04L 12/801* (2013.01)
*H04L 12/851* (2013.01)
*H04L 12/891* (2013.01)
*H04L 12/911* (2013.01)
*H04L 12/931* (2013.01)
*H04L 29/08* (2006.01)
*H04L 29/14* (2006.01)
*H04L 1/16* (2006.01)
*H04W 84/12* (2009.01)
*H04W 88/08* (2009.01)
*H04L 29/06* (2006.01)

(52) U.S. Cl.
CPC ........ *H04L12/5695* (2013.01); *H04L 41/0816* (2013.01); *H04L 47/125* (2013.01); *H04L 47/14* (2013.01); *H04L 47/15* (2013.01); *H04L 47/24* (2013.01); *H04L 47/2408* (2013.01); *H04L 47/41* (2013.01); *H04L 47/822* (2013.01); *H04L 47/824* (2013.01); *H04L 47/828* (2013.01); *H04L 49/351* (2013.01); *H04L 67/14* (2013.01); *H04L 67/18* (2013.01); *H04L 67/327* (2013.01); *H04L 69/40* (2013.01); *H04L 69/324* (2013.01); *H04L 1/1607* (2013.01); *H04L 49/205* (2013.01); *H04W 84/12* (2013.01); *H04W 88/08* (2013.01); *H04L 69/18* (2013.01); *H04L 69/14* (2013.01); *H04L 69/32* (2013.01)

(56) References Cited

U.S. PATENT DOCUMENTS

| | | | |
|---|---|---|---|
| 6,023,733 A * | 2/2000 | Periasamy et al. | 709/241 |
| 6,081,523 A | 6/2000 | Merchant et al. | |
| 6,578,086 B1 * | 6/2003 | Regan et al. | 709/242 |
| 6,643,292 B2 * | 11/2003 | Chapman et al. | 370/395.52 |
| 6,760,778 B1 | 7/2004 | Nelson et al. | |
| 6,956,824 B2 | 10/2005 | Mark et al. | |
| 7,085,306 B1 * | 8/2006 | Voldman et al. | 375/132 |
| 2001/0025321 A1 | 9/2001 | Tang et al. | |
| 2002/0131363 A1 * | 9/2002 | Beshai et al. | 370/230 |
| 2002/0142777 A1 | 10/2002 | McGovern et al. | |
| 2003/0035413 A1 | 2/2003 | Herle et al. | |
| 2003/0083007 A1 | 5/2003 | Remy et al. | |
| 2003/0091033 A1 | 5/2003 | Van Den Boeck et al. | |
| 2006/0165015 A1 * | 7/2006 | Melick et al. | 370/254 |
| 2008/0225832 A1 * | 9/2008 | Kaplan et al. | 370/352 |

FOREIGN PATENT DOCUMENTS

| | | |
|---|---|---|
| WO | 02/41660 | 5/2002 |
| WO | 02/073354 | 9/2002 |

OTHER PUBLICATIONS

EPO Communication dated Mar. 3, 2011 in Application No. 03749502.5-1249 / 1573949.

* cited by examiner

SYSTEM AND METHOD FOR PROVIDING A SUPER CHANNEL IN A MULTI-BAND MULTI-PROTOCOL HYBRID WIRED/WIRELESS NETWORK

CROSS-REFERENCE TO RELATED APPLICATIONS/INCORPORATION BY REFERENCE

This application makes reference to, claims priority to, and claims the benefit of: U.S. Provisional Patent Application Ser. No. 60/433,198 entitled "Method and System for Providing a Super Channel in a Multi-band Multi-protocol Hybrid Wired/Wireless Network" filed on Dec. 31, 2002;

U.S. Provisional Patent Application Ser. No. 60/411,261 entitled "Communications Systems Software and Protocols" filed on Sep. 17, 2002; and U.S. Provisional Patent Application Ser. No. 60/411,301 entitled "Method and System for Providing a Scalable Integrated Switch and Wireless Architecture" filed on Sep. 17, 2002.

The application also makes reference to U.S. patent application Ser. No. 10/606,565 entitled "Method and System for Network Management in a Hybrid Wired/Wireless Network" filed on Jun. 26, 2003.

The above stated applications are all incorporated herein by reference in their entirety.

FIELD OF THE INVENTION

Embodiments of the present application relate generally to hybrid wired/wireless networking, and more particularly to a method and system for providing a super channel in a multi-band multi-protocol hybrid wired/wireless network.

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of about 19 meters (m) or so in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/OA or a ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless networks that utilize one or more protocols in the 802.11 suite of protocols, the mobility of access devices throughout the network may pose additional challenges for conventional switches and switching equipment. Since access devices are continuously changing their point of access to the network, conventional switches may not have the capability to effectively control other network devices and/or entities in order to provide seamless communication throughout the network. Accordingly, allocation and de-allocation of certain network resources can be problematic in these networks where traffic dynamics are continuously changing. Moreover, particularly in network systems that may handle large volumes of access device traffic, providing adequate security may also pose additional problems.

In hybrid wired/wireless networks that utilize one or more protocols in the 802.11 suite of protocols, the mobility of access devices throughout the network may pose additional challenges for conventional switches and switching equipment. Since access devices are continuously changing their point of access to the network, conventional switches may not have the capability to effectively control other network devices and/or entities in order to provide seamless communication throughout the network. Accordingly, allocation and de-allocation of certain network resources can be problematic in these networks where traffic dynamics are continuously changing. Moreover, particularly in network systems that may handle large volumes of access device traffic, providing adequate security may also pose additional problems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a method and system for providing a super channel in a multi-band multi-protocol hybrid wired/wireless network. The method may be utilized for providing enhanced connectivity in a multi-band, multi-protocol network. In this regard, messages from a physical layer of each communication band and each communication channel associated with each of a plurality of protocols of the multi-band, multi-protocol network may be aggregated into a single multi-protocol layer. The single multi-protocol layer may be a super channel layer of a single protocol stack. An optimal communication path may be identified from among the communication bands and/or communication channels based on information borne by the single multi-protocol layer. A communication session may be established using the identified optimal communication path. The communication path may include different channels within a single communication band and/or channels selected from different communication bands. In this regard, channels from the same or from different communication bands may be combined to provide an optimal communication path for accommodating a communication session. The single multi-protocol layer may be a super channel layer that may be characterized as a sublayer located within the data link layer of the single protocol stack. Accordingly, the single multi-protocol layer may be located above a MAC layer which interfaces with the physical layer.

In another aspect of the invention, at least a portion of the messages aggregated in the single multi-protocol layer may be monitored by any one or more of a network management process, a bandwidth management process, a load balancing process, a session control process and a QoS management process. Any one or more of the network management process, bandwidth management process, load balancing process, session control process and QoS management process may be interfaced with the super channel. Moreover, any one or more of the network management process, bandwidth management process, load balancing process, session control process and QoS management process may be adapted to extract channel specific data from the single multi-protocol layer of the single protocol stack. Finally, each of the network management process, bandwidth management process, load balancing process, session control process and QoS management process may be configured to exchange or share information among each other to more efficiently manage the network.

Another embodiment of the invention may provide a machine-readable storage, having stored thereon, a computer program having at least one code section for providing enhanced connectivity in a multi-band, multi-protocol network. The at least one code section may be executable by a machine, thereby causing the machine to perform the steps as described in the method for providing enhanced connectivity in a multi-band, multi-protocol network.

In accordance with another embodiment of the invention, a system for enhanced connectivity in a multi-band, multi-protocol network may be provided. The system may include a single protocol stack for handling messages associated with each protocol. The single protocol stack may include a single multi-protocol layer for aggregating messages from a physical layer associated with each communication channel and/or communication band in the multi-band, multi-protocol network. Each communication channel and/or communication band may correspond to each of a plurality of protocols utilized in the multi-band, multi-protocol network. Means for determining and/or identifying an optimal communication path from among the communication band and/or communication channel may be provided. Means for establishing a communication session using the identified optimal communication path may be also provided. Finally, means may be provided for selecting at least one communication channel or communication band, or a combination thereof for facilitating the communicating session.

In one aspect of the invention, the single multi-protocol layer may be a arranged and located as a sublayer within a data link layer. The single multi-protocol layer may be characterized as a super channel sublayer and may include means for interfacing the single multi-protocol layer immediately above and with a MAC layer. In this arrangement, the MAC layer may be interfaced with the physical layer, the latter of which may be located below said MAC layer. Moreover, the single multi-protocol layer may reside above the MAC layer.

Another aspect of the invention may include a network management process, a bandwidth management process, a load balancing process, a session control process and/or a QoS management process, each of which may be adapted to interface with the super channel or single multi-protocol layer. Any one or more of the network management process, bandwidth management process, load balancing process, session control process and QoS management process, may be adapted to monitor at least a portion of the aggregated messages in the single multi-protocol layer. Each of the network management process, bandwidth management process, load balancing process, session control process and QoS management processes may be adapted to extract channel specific data from the single multi-protocol layer. Accordingly, the extracted information acquired by each of the network management process, bandwidth management process, load balancing process, session control process and QoS management processes may be shared among one or more of the other processes. In this regard, information from the various processes may be utilized to provide a more robust communication system and channel.

In another aspect of the invention, each of the network management process, bandwidth management process, load balancing process, session control process and QoS management processes may be associated with corresponding processors or controllers. Accordingly, the network management process may be controlled by a network management processor or controller. The bandwidth management process may be controlled by a bandwidth management processor or controller. The load balancing process may be controlled by a load balancing processor or controller. The session control process may be controlled by a session control processor or controller. Finally, the QoS management processes may be controlled by a QoS management processor or controller. Notwithstanding, one or more of the network management process, bandwidth management process, load balancing process, session control process and QoS management and/or their corresponding processors may be controlled by a main processor.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for providing a super channel in a multi-band multi-protocol hybrid wired/wireless network. The method may be utilized for providing enhanced connectivity in a multi-band, multi-protocol network. In this regard, messages from a physical layer of each communication band and each communication channel associated with each of a plurality of protocols in a single multi-protocol layer of the multi-band, multi-protocol network may be aggregated into a single multi-protocol layer. A single protocol stack is provided in which the single multi-protocol layer may be a super channel layer. An optimal communication path may be identified from among the communication band and/or communication channel based on information borne by the single multi-protocol layer of the single protocol stack. A communication session may be established using the identified optimal communication path. The communication path may include different channels within a single communication band, and/or channels selected from different communication bands. In this regard, channels from the same or from different communication bands may be combined to provide an optimal communication path for accommodating a communication session.

In conventional multi-band multi-protocol hybrid wired/wireless systems, each protocol handled by the system requires its own protocol stack. In this regard, each protocol stack handles and processes the messages associated with a particular protocol, and/or communication band. An inherent disadvantage with such systems is that each protocol and/or communication band requires its own hardware and/or software for handling its associated protocol stack, thereby complicating processing. Moreover, since each protocol requires its own protocol stack, the need for additional hardware and/or software translates to increased system cost. Accordingly, the invention provides a single protocol stack having a super channel or multi-protocol layer that may be adapted to aggregate the messages from the PHY layer of each protocol or communication band. This may eliminate a need to provide separate protocol stacks for handling and processing messages associated with each protocol or communication band.

Figure 1A:
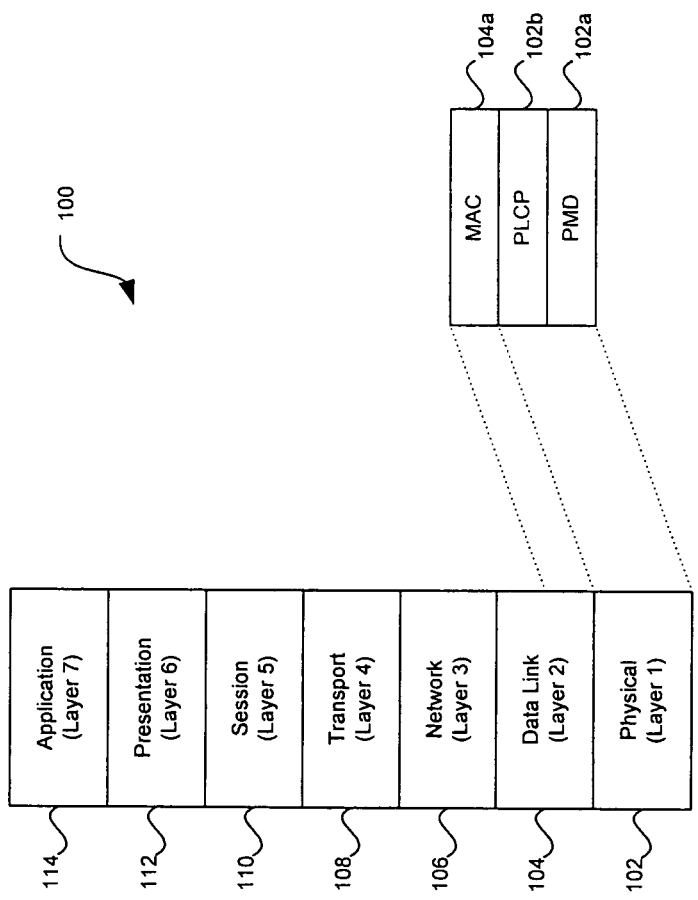
FIG. 1a is a block diagram of the OSI model.
Figure 1B:
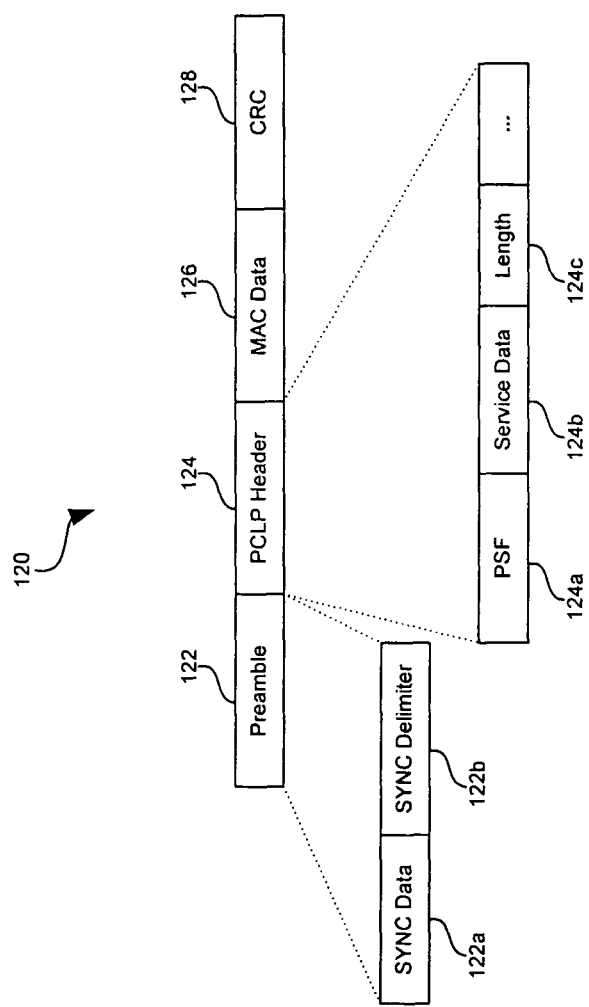
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
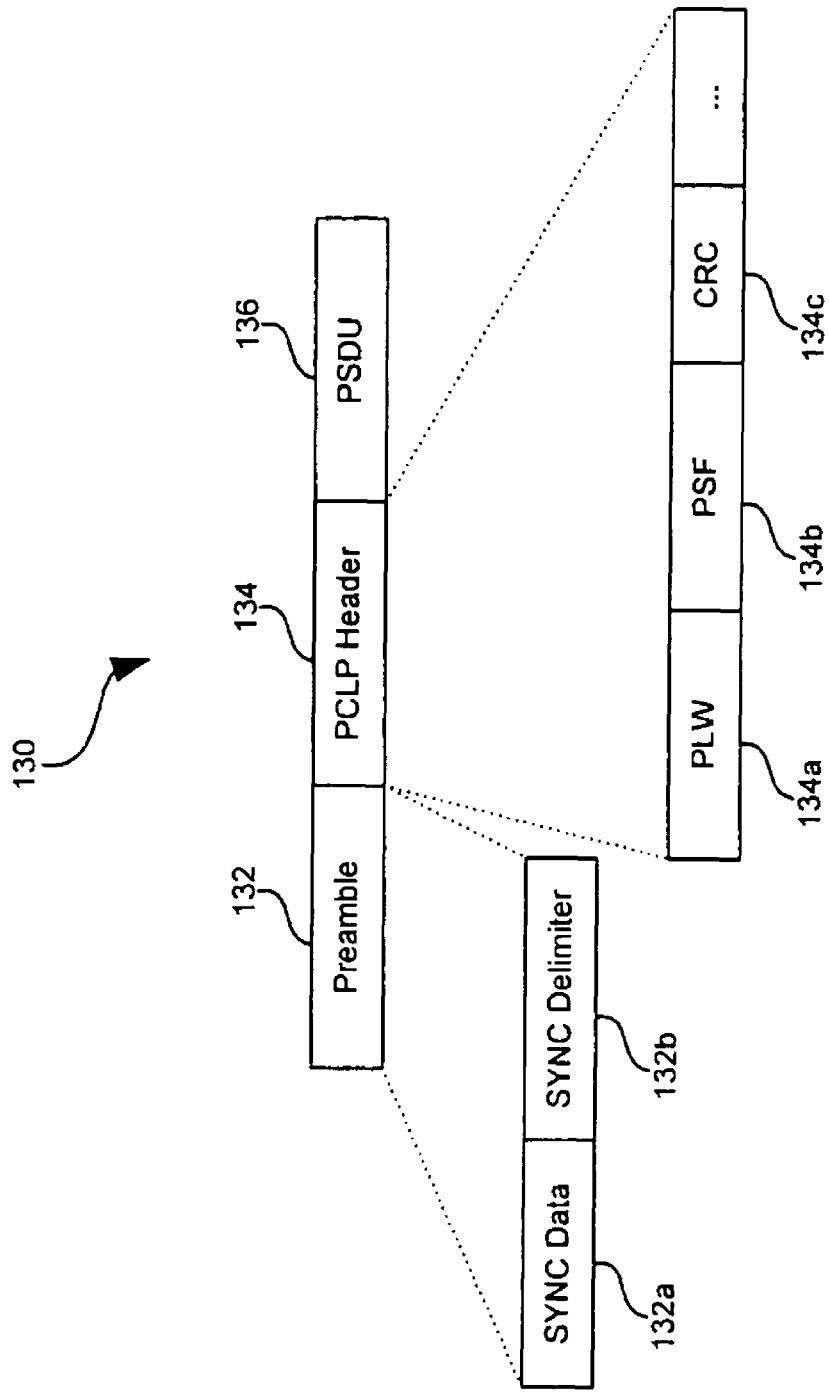
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134b be may be 4-bits in length and may be used to denote the communication data rate.

Figure 1D:
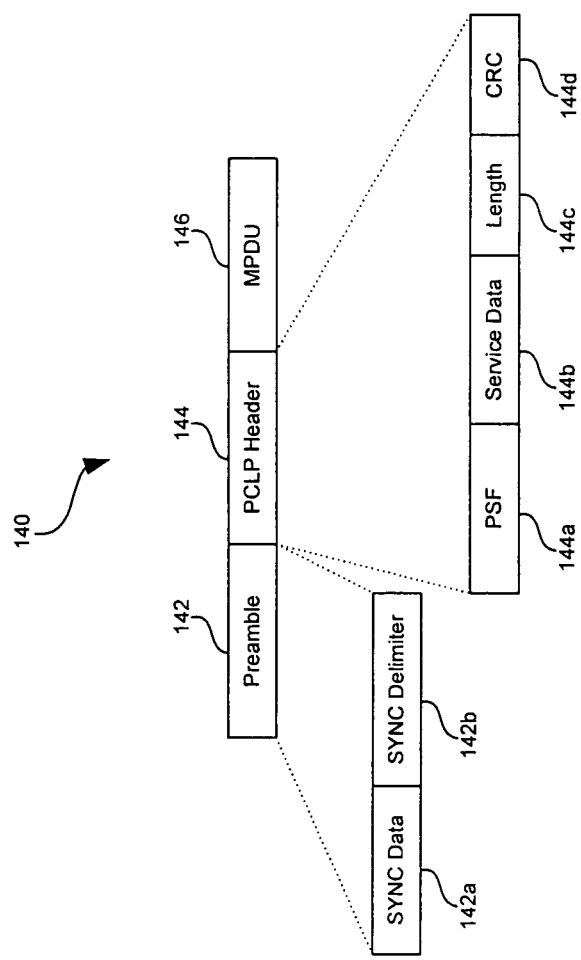
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
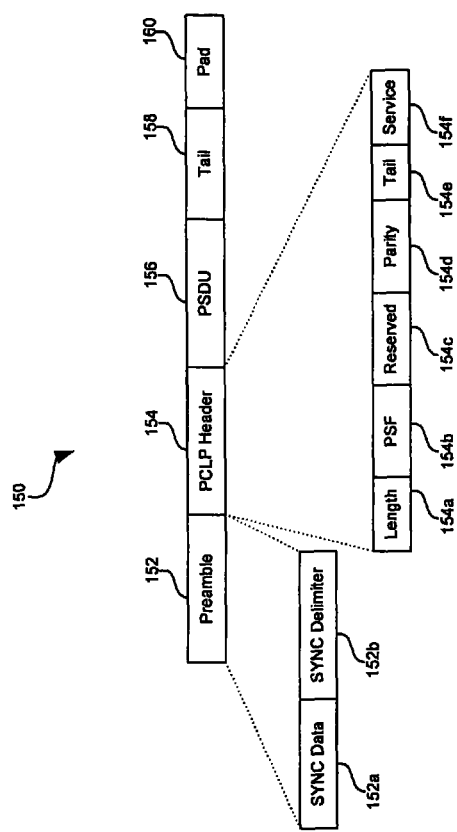
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154*f* is a 16-bit field that may be adapted to indicate the type of service.

In accordance with an embodiment of the invention, a single protocol stack having a super channel or single multi-protocol layer may be provided. The super channel or single multi-protocol layer may be adapted to provide seamless communication between various communication standards and protocols. For example, the super channel may be adapted to combine or aggregate a plurality of channels from different communication bands to create a multi-band, multi-protocol stack. For example, one or more Bluetooth channels, 802.11a channels, 802.11b and/or 802.11g channels may be combined into a single multi-band, multi-protocol stack. The combination of channels may result in a super channel set that may be adapted to receive and process communication information from a plurality of transceivers operating in different communication bands.

In accordance with the invention, a multi-band, multi-protocol access point and/or switch may be adapted to provide service to one or more of a plurality of access devices which may operate in one or more of a plurality of communication bands. For example, a first access device may be capable of operating on an 802.11a compatible channel. Similarly, a second access device may be capable of operating on an 802.11b compatible channel. A third access device may be capable of operating on a 802.11g compatible channel. Finally, a fourth access device may be capable of operating on 802.11a and 802.11b compatible channels. Accordingly, the multi-band multi-protocol access point may be adapted to provide communication service to any of the first, second, third and/or fourth access devices that may be located within its service or coverage area.

In an embodiment of the invention, the super channel may be adapted to monitor, for example, channel traffic across the entire bandwidth or spectrum covered by the super channel. For example, in a case where a multi-band, multi-protocol access point may be adapted to handle Bluetooth, 802.11a, and 802.11b channels, the access point may be adapted to monitor each of the channels at the PHY layer of the super channel. Accordingly, the access point may be adapted to provide effective channel and/or traffic management among the various communication channels, communication bands, and access devices that may be serviced by the access point. In this regard, an access point may be adapted to coordinate activities such as bandwidth sharing, bandwidth management, QoS management, load management, handover, and roaming.

In one aspect of the invention, depending on a traffic load on one or more channels handled by an access point, for example, if there is sufficient bandwidth available, one or more channels may be reserved to provide feedback to access devices serviced by the access point. The feedback information may include, but is not limited to, information such as bandwidth utilization, quality of service (QoS), and service type. The super channel may be adapted to facilitate the extraction of information such as the service types, which may be obtained from the PLCP sublayer. In another aspect of the invention, each access device or client may be adapted to periodically monitor channels which may be designated as feedback channels. For example, in a case where a feedback channel may provide information related to QoS, an access device may be instructed to tune its transceiver to a channel which may be less crowded and/or provides a better QoS. Similarly, in a case where a particular band may be crowded, bandwidth related information acquired from the super channel may be utilized to select an alternate communication channel or communication band having available bandwidth. Accordingly, the access device may be instructed to tune its transceivers to the alternate communication channel having available bandwidth.

Figure 2A:
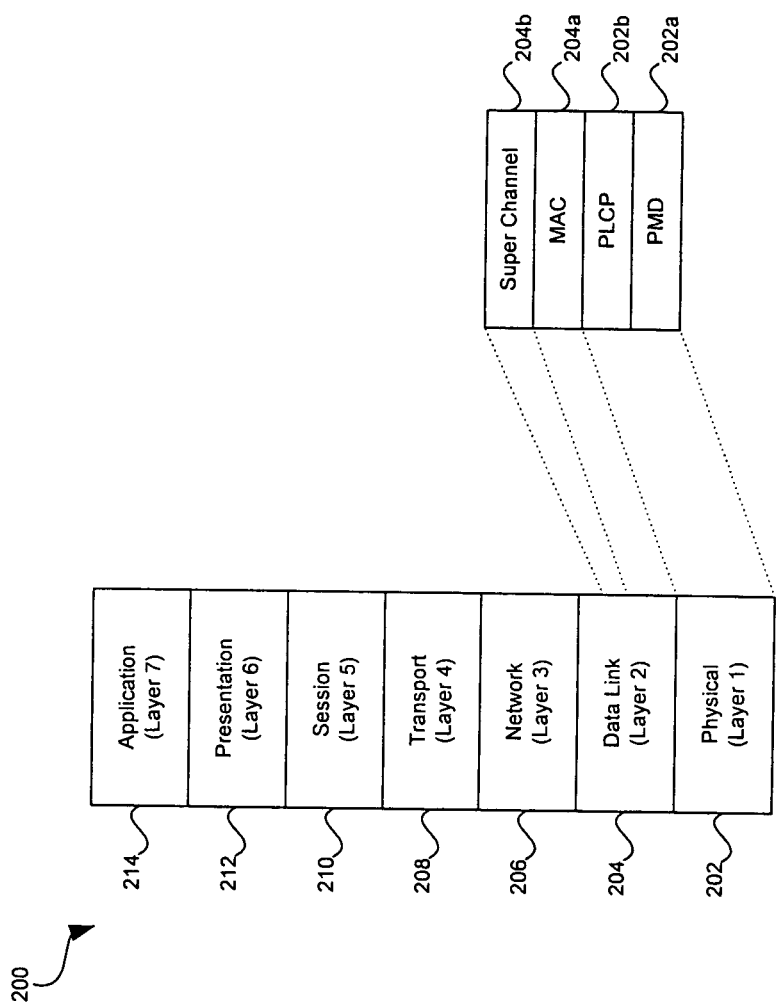
FIG. 2a is a block diagram of a super channel in accordance with an embodiment of the invention.

In accordance with an embodiment of the invention, the super channel may be implemented as a layer immediately above and interfacing with the MAC layer in the protocol stack. FIG. 2*a* is a block diagram 200 of a super channel in accordance with an embodiment of the invention. Referring to FIG. 2*a*, there is illustrated a protocol stack in accordance with an embodiment of the invention. The protocol stack in accordance with the invention may have the seven distinct functional layers including application layer 214, presentation layer 212, session layer 210, transport layer 208, network layer 206, data link layer 204 and physical layer 202. The physical layer 202 may further include the physical layer convergence procedure (PLCP) sublayer 202*b* and a physical media dependent sublayer (PMD) 202*a*. The data link layer 204 may also include the medium access control (MAC) layer 204*a*. Additionally, the data link layer 204 may also include a super channel layer or multi-protocol layer 204*b*.

In operation, the super channel layer 204*b* may exploit the services and functions provided by the interfacing MAC layer 204*a* on top of which the super channel layer 204*b* resides. The super channel layer 204*b* may be adapted to utilize the services of the MAC layer to acquire channel specific information from, for example, the PLCP sublayer 202*b* and the PMD sublayer 202*a*. In one aspect of the invention, the super channel layer 204*b* may be viewed as an enhanced or super MAC layer, although the invention is not so limited. The super channel layer 204*b* may be adapted to provide services to one or more of the upper layers of the protocol stack.

For example, in the case of high rate direct sequence spread spectrum (HR-DSS) modulation scheme, the super channel layer 204*b* may acquire information such as the PLCP signal field (PSF) 144*a* of FIG. 1*d* and service data 144*b* from the PLCP header 144. Similarly, in the case of orthogonal frequency division multiplexing (OFDM), the super channel layer 204*b* may be adapted to acquire information such as the PLCP signal field (PSF) 154*b*, and service 154*f* from the PLCP header 154.

Figure 2B:
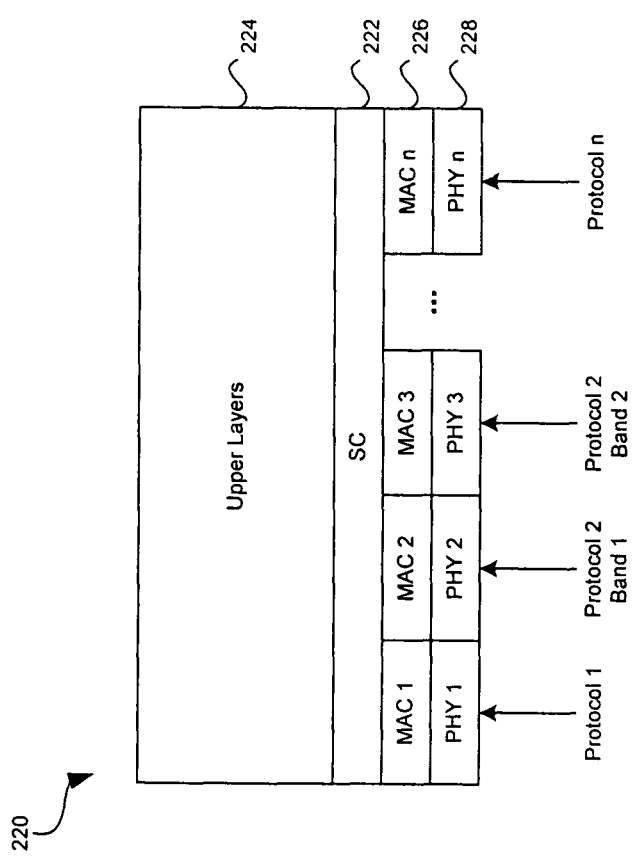
FIG. 2b is a block diagram of a super channel adapted to handle a plurality of protocols in accordance with an embodiment of the invention.

FIG. 2*b* is a block diagram 220 of a super channel adapted to handle a plurality of protocols in accordance with an embodiment of the invention. Referring to FIG. 2*b*, there is shown a super channel (SC) layer 222, MAC layers MAC 1, MAC 2, MAC 3, . . . , MAC n, collectively 226, and physical layers PHY 1, PHY 2, PHY 3, . . . , PHY n, collectively 228. The upper layers residing above the super channel layer or single multi-protocol layer 224 may be collectively illustrated as 224. The PHY 1 and the MAC 1 layers correspond to protocol 1. The PHY 2 and the MAC 2 layers correspond to protocol 2, communication band 1. The PHY 3 and the MAC 3 layers correspond to protocol 2, communication band 2. Finally, the PHY n and the MAC n layers correspond to protocol n. In this regard, the single multi-protocol layer 224 may be adapted to handle and process all the messages associated with each of protocol 1, protocol 2 communication band 1, protocol 2 communication band 2, . . . , and protocol n.

In a typical multi-band, multi-protocol wireless local area network, especially as access devices become mobile throughout the network, channel capacity may be rapidly time varying. For example, when the distance from an access device to an access point increases or decreases due to mobility, the channel capacity and ultimately the channel throughput among various bands and channels may change due to continuous association and dis-association of access devices with access points. In accordance with an embodiment of the invention, the super channel may be adapted to provide, for example, network management services to the upper layers of the protocol stack. In this regard, a switch may be provided to facilitate network management between one or more of a plurality of access devices and/or access points, and/or other switches communicating via one or more communication bands utilizing the same or different protocols. The switch may utilize a messaging protocol, which may be adapted to facilitate tasks such as quality of service (QoS) control and management, switch filter transfer, bandwidth management, session control and management and/or load balancing.

U.S. patent application Ser. No. 10/606,565 entitled "Method and System for Network Management in a Hybrid Wired/Wireless Network" filed on Jun. 26, 2003, provides an system for network management which includes QoS management, load balancing, bandwidth management, and session control management, and is incorporated herein by reference in its entirety.

Referring to the task of network management, in a hybrid wired/wireless LAN in which network capacity may be rapidly changing over time due to the mobility of access devices, the switch, in accordance with an aspect of the invention, may be configured to perform various network management tasks for a wired and/or a wireless portion of the network. The task of network management may involve performing one or more activities including, but not limited to, QoS management, bandwidth management including tracking bandwidth usage and allocating and de-allocating bandwidth to meet user and/or client demands. The management of these activities may be directly or indirectly related to providing mobility and operability throughout a multi-band multi-protocol wired and/or wireless LAN, or a hybrid combination thereof. The super channel may provide a layer in which data related to access devices operating on different channels and/or on different communication bands in a multi-channel multi-protocol system may be readily accessible. Accordingly, one or more of a QoS management process, bandwidth management process, a load balancing process, a session control process and a network management process may be adapted to acquire information from the super channel and use the acquired information to provide more efficient network management.

Figure 3:
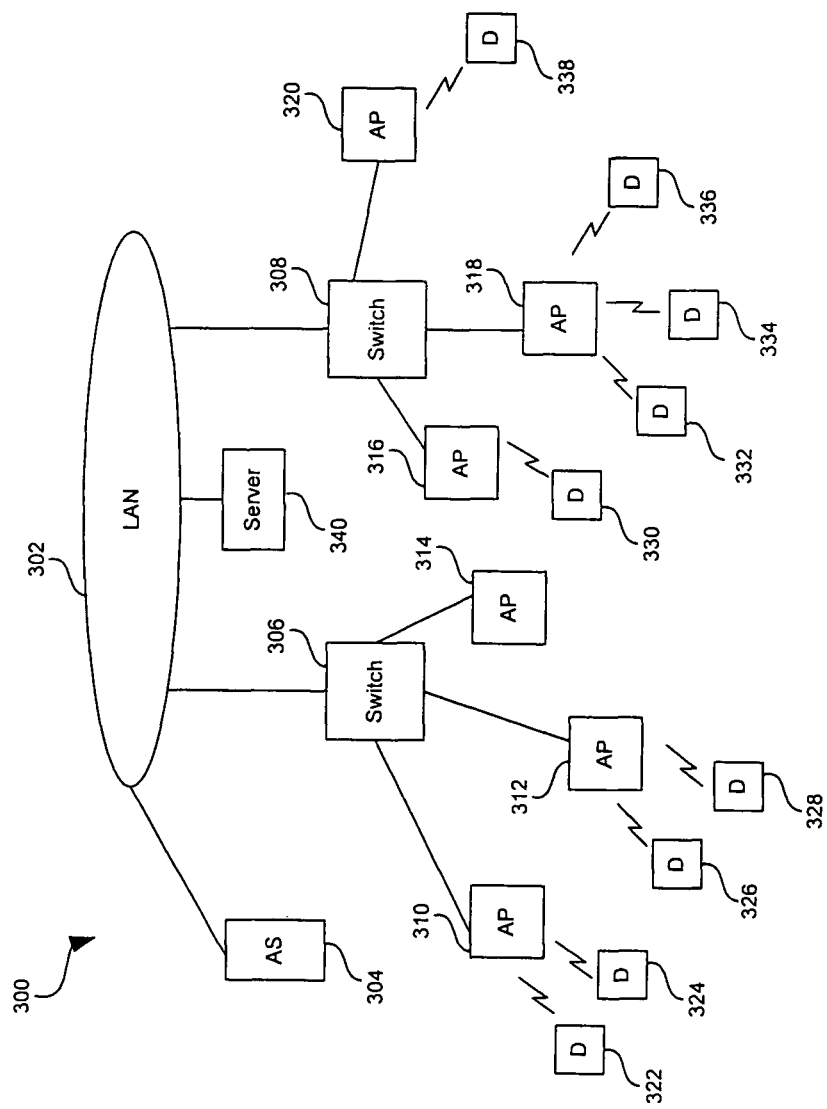
FIG. 3 is a block diagram 300 of an exemplary multi-band multi-protocol hybrid wired/wireless network that may utilize a super channel in accordance with an embodiment of the invention.

FIG. 3 is a block diagram 300 of an exemplary multi-band multi-protocol hybrid wired/wireless network that may utilize a super channel in accordance with an embodiment of the invention. Referring to FIG. 3, there is shown, a local area network (LAN) 302, authentication server 304, switches 306, 308, access points (APs) 310, 312, 314, 316, 318, 320 and access devices 322, 324, 326, 328, 330, 332, 334, 336, 338. The block diagram 302 may be a representative of an Enterprise WLAN although the invention is not so limited.

The LAN 302 may be adapted to provide a transport medium between switch 306 and switch 308. Access points 316, 318, 320 may be coupled to switch 308. For illustrative purposes, access points 316, 318, 320 may be 802.11a and 802.11b compliant. In addition, access point 318 may be Bluetooth compliant. In this regard, the access points 316, 318, 320 may include multiple transceivers that may be configured to operate on different communication bands and/or one or more of a plurality of multi-band multi-protocol transceivers. Access point 316 may provide service to access device or client 330, which may be, for example, an 802.11b compliant device. Access point 318 may provide service to access devices or clients 332, 334, 336 which may be located within a coverage area of access point 318. Access device 332 may be 802.11a compliant and access device 334 may be 802.11g compliant. Access device 336 may be 802.11b and Bluetooth compliant. Finally, access point 320 may provide service to access device 338 which may be located within the service area of access point 320. The access device or client 338 may be 802.11g compliant.

For illustrative purposes, access points 310, 312, 314 may be 802.11g compliant. In addition, access point 312 may be Bluetooth compliant. In this regard, the access points 310, 312, 314 may include multiple transceivers that may be configured to operate on different communication bands and/or one or more of a plurality of multi-band multi-protocol transceivers. Access point 310 may provide service to access devices or clients 322, 324, which may be located within a coverage area of access point 310. Access device 322 may be, an 802.11a compliant device and access device 324 may be an 802.11g compliant device, for example. Access point 312 may provide service to access devices or clients 326, 328, which may be located within a coverage area of access point 312. Access device 326 may be 802.11a compliant and access device 328 may be 802.11g and Bluetooth compliant.

In operation, an originating access device such as access device 328 may initiate a communication session with a terminating access device or client such as access device 334. Upon initiation of the communication session, access point 312 may request that switch 306 establish a virtual circuit connecting the originating access device 328 and the terminating access device 334. A network management process associated with one or more of switches 306, 308 and/or access points 312, 318 may be adapted to acquire information from the super channel layer in order to determine a most efficient path for accommodating the communication session. In this regard, one or more different channels and/or communication bands may be utilized to provide communication between the initiating and terminating access devices.

In one aspect of the invention, one or more of a plurality of processes may be utilized to select a most efficient path for accommodating the communication session. Any one or more of a network management process, a load management process, a bandwidth management process, a session control process and a QoS management process may be adapted to acquire information from the super channel layer and determine, for example, an appropriate channel that may be utilized for the communication session. In this regard, the appropriate channel may be selected such that co-channel interference is minimal, a load balance may be maintained, a minimum QoS may be maintained, and bandwidth is efficiently utilized throughout the network.

Figure 4:
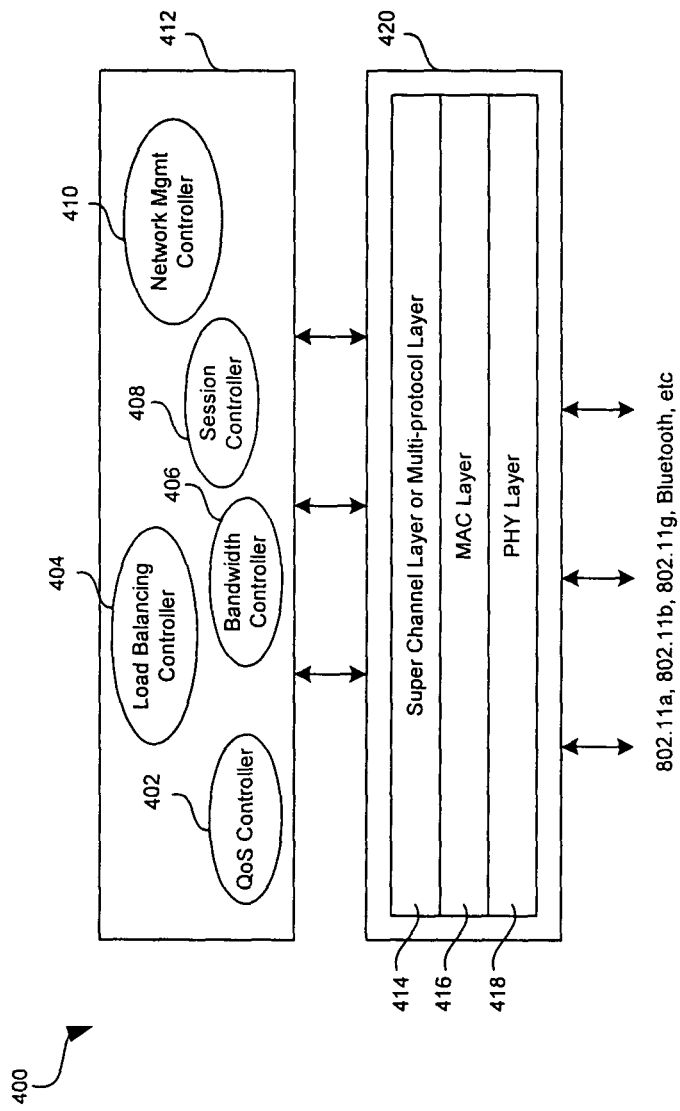
FIG. 4 is a block diagram of an exemplary system that may be utilized for providing enhanced connectivity in a multi-band multi-protocol network in accordance with an embodiment of the invention.

FIG. 4 is a block diagram 400 of an exemplary system that may be utilized for providing enhanced connectivity in a multi-band multi-protocol network in accordance with an embodiment of the invention. Referring to FIG. 4, there is shown the lower portions of a stack 420 and a processor block 412. The stack 420 may include a PHY layer 418, a MAC layer 416 and a super channel layer 414. The processor block 412 may include a QoS controller 402, a load balancing controller 404, a bandwidth controller 406, a session controller 408 and a network management controller 410. The processor block 412 may be part of a switch or an access point.

The super channel layer or single multi-protocol layer 414 may be arranged and located as a sublayer within a data link layer. The single multi-protocol layer 414 may be characterized as a super channel sublayer within the data link. As illustrated in FIG. 4, the data link layer may include MAC layer 416 and the super channel or single multi-protocol layer 414. The single multi-protocol layer 414 interfaces with and is located immediately above MAC layer 416. In this arrangement, the MAC layer 416 interfaces with the physical layer 418, the latter of which is located below the MAC layer 416.

Each of the controllers 402, 404, 406, 408, 410 in processor block 412 may be associated with a corresponding network processing function, namely, a QoS management process, a load balancing process, a bandwidth management process, a session control process and a network management process, respectively. Accordingly, the QoS management processes may be controlled by the QoS management processor or controller 402. The load balancing process may be controlled by a load balancing processor or controller 404. The bandwidth management process may be controlled by a bandwidth management processor or controller 406. The session control process may be controlled by a session control processor or controller 408. Finally, the network management process may be controlled by a network management processor or controller 410. Notwithstanding, one or more of the QoS management process, load balancing process, bandwidth management process, session control process and network management process and/or their corresponding processors may be controlled by a main or host processor.

In accordance with an embodiment of the invention, the single multi-protocol layer or super channel 414 may be adapted to aggregate or accumulate messages from the physical layer 418 associated with each communication channel and/or communication band in a multi-band, multi-protocol network. For example, the single multi-protocol layer or super channel 414 may be adapted to aggregate or accumulate 802.11a, 802.11b, and Bluetooth compliant messages received from the physical layer 418. Each communication channel and/or communication band may correspond to each of a plurality of protocols utilized in the multi-band, multi-protocol network. For example, an 802.11b compliant access device may operate in the 2.4 GHz communication band, while an 802.11a compliant access device may operate in the 5.2 GHz communication band. In the case of an 802.11b communication band, various communication channels may be defined in the frequency range of 2.4 GHz to 2.4835 GHz. In the case of 802.11a, various communication channels may be defined in the frequency range of 5.150 GHz to 5.350 GHz and from 5.725 GHz to 5.825 GHz.

One or more of the processes and/or controllers in processor block 412 may be adapted to acquire channel information from the super channel or the single multi-protocol layer 414. The acquired channel information may be used to determine and/or identify an optimal communication path from among the communication bands and/or communication channels that may be available. Based on channel information in the super channel or multi-protocol layer 414, the processor block 412 may select at least one communication channel or communication band, or a combination thereof for facilitating the communicating session. The communication channel or communication band may be associated with different protocols or bands within a protocol. Finally, the processor block 412 may be configured to establish a communication session using the identified optimal communication path.

In another aspect of the invention, one or more of the network management controller 410, bandwidth management controller 406, load balancing controller 404, session controller 408 and/or QoS management controller 402 may be adapted to interface with the super channel or single multi-protocol layer 414. Any one or more of the network management controller 410, bandwidth management controller 406, load balancing controller 404, session controller 408 and/or QoS management controller 402 may be adapted to monitor at least a portion of the aggregated messages in the single multi-protocol layer 414. Each of the network management controller 410, bandwidth management controller 406, load balancing controller 404, session controller 408 and/or QoS management controller 402 may be adapted to extract channel specific data from the single multi-protocol layer 414. Accordingly, the extracted information acquired by each of the network management controller 410, bandwidth management controller 406, load balancing controller 404, session controller 408 and/or QoS management controller 402 may be shared among one or more of the other processes. In this regard, information from the various processes handled by the controllers in processor block 412 may be utilized to provide a more robust communication system.

In accordance with another embodiment of the invention, dependent on the modulation scheme utilized, one or more of the PLCP frames illustrated in FIG. 1b, FIG. 1c, FIG. 1d and FIG. 1e may be adapted to contain information which may be utilized for providing communication between the plurality of access points in one or more mesh networks in accordance with embodiments of the invention. Additionally, the PLCP frames may be adapted to convey information for any one or more of the 801.11a, 802.11b and 802.11g modes of operation utilized by access points and/or access devices in accordance with embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing enhanced connectivity in a multi-band, multi-protocol network, the method comprising:

combining a plurality of communication channels from one or more communication bands, the plurality of communication channels associated with a plurality of communication protocols, into a single protocol stack including a super channel layer and a MAC layer, the super channel layer above the MAC layer;

receiving messages over a physical layer of the one or more communication bands and corresponding communication channels and aggregating the messages into the super channel layer; and accessing the super channel layer to establish a communication session to transmit the aggregated messages.

2. The method according to claim 1, further comprising determining, based on the aggregated messages, whether at least one of the communication channels, the one or more communication bands, and a combination of the communication channels and the one or more communication bands provides an optimal communication path for the communication session.

3. The method according to claim 2, further comprising selecting at least one of the communication channels and one or more communication bands, and a combination of the communication channels and the one or more communication bands to provide the communication session.

4. The method according to claim 1, further comprising locating the super channel layer as a sublayer within a data link layer.

5. The method according to claim 1, further comprising interfacing the super channel layer with the physical layer located below the MAC layer.

6. The method according to claim 1, further comprising monitoring a portion of the aggregated messages in the super channel layer by at least one of a network management process, a bandwidth management process, a load balancing process, a session control process and a QoS management process.

7. The method according to claim 6, further comprising interfacing at least one of the network management process, bandwidth management process, load balancing process, session control process and QoS management process with the super channel layer.

8. The method according to claim 7, further comprising extracting channel specific data from the super channel layer by at least one of the network management process, bandwidth management process, load balancing process, session control process and QoS management process.

9. The method according to claim 8, further comprising sharing channel information acquired by each of the network management process, bandwidth management process, load balancing process, session control process and QoS management process among one or more of the network management process, bandwidth management process, load balancing process, session control process and QoS management process.

10. A machine-readable storage device, having stored thereon, a computer program having at least one code section for providing enhanced connectivity in a multi-band, multi-protocol network, the at least one code section executable by a machine to cause the machine to:

combine a plurality of communication channels from one or more communication bands, the plurality of communication channels associated with a plurality of communication protocols, into a single protocol stack including a super channel layer and a MAC layer, the super channel layer above the MAC layer;

receive messages over a physical layer of the one or more communication bands and corresponding communication channels and aggregate the messages into the super channel layer; and access the super channel layer to establish a communication session to transmit the aggregated messages.

11. The machine-readable storage device according to claim 10, further comprising code to cause the machine to determine, based on the aggregated messages, at least one of the communication channels, the one or more communication bands, and a combination of the communication channels and the one or more communication bands provides an optimal communication path for the communication session.

12. The machine-readable storage device according to claim 11, further comprising code to cause the machine to select at least one of the communication channels and one or more communication bands, and a combination of the communication channels and the one or more communication bands to provide the communication session.

13. The machine-readable storage device according to claim 12, comprising code to cause the machine to select the super channel layer as a sublayer within a data link layer.

14. The machine-readable storage device according to claim 12, further comprising code to cause the machine to interface the super channel layer with the physical layer that is located below the MAC layer.

15. The machine-readable storage device according to claim 10, further comprising code to cause the machine to monitor at least a portion of the aggregated messages in the super channel layer by at least one of a network management process, a bandwidth management process, a load balancing process, a session control process and a QoS management process.

16. The machine-readable storage device according to claim 15, further comprising code to cause the machine to interface at least one of the network management process, bandwidth management process, load balancing process, session control process and QoS management process with the single multi-protocol layer.

17. The machine-readable storage device according to claim 16, further comprising code to cause the machine to extract channel specific data from the super channel layer by at least one of the network management process, bandwidth management process, load balancing process, session control process and QoS management process.

18. The machine-readable storage device according to claim 17, further comprising code to cause the machine to share channel information acquired by each of the network management process, bandwidth management process, load balancing process, session control process and QoS management process among one or more of the network management process, bandwidth management process, load balancing process, session control process and QoS management process.

19. A system for providing enhanced connectivity in a multi-band, multi-protocol network, the system comprising:

at least one processor that combines a plurality of communication channels from one or more communication bands, the plurality of communication channels associated with a plurality of communication protocols, into a single protocol stack including a super channel layer and a MAC layer, the super channel layer above the MAC layer;

means for receiving messages over a physical layer of the one or more communication bands and corresponding communication channels and aggregating the messages into the super channel layer; and means for accessing the super channel layer to establish a communication session to transmit the aggregated messages.

20. The system according to claim 19, further comprising means for determining based on the aggregated messages, at least one of the communication channels, the one or more communication bands, and a combination of the communication channels and the one or more communication bands provides an optimal communication path for the communication session.

21. The system according to claim 20, further comprising means for selecting at least one of the communication channels and one or more communication bands, and a combination of a communication channel and a communication band to provide the communication session.

22. The system according to claim 21, further comprising means for locating the super channel layer as a sublayer within a data link layer.

23. The system according to claim 21, further comprising means for interfacing the super channel layer with the physical layer located below the MAC layer.

24. The system according to claim 19, further comprising means for monitoring a portion of the aggregated messages in the super channel layer by at least one of a network management process, a bandwidth management process, a load balancing process, a session control process and a QoS management process.

25. The system according to claim 24, further comprising means for interfacing at least one of the network management process, bandwidth management process, load balancing process, session control process and QoS management process with the super channel layer.

26. The system according to claim 25, further comprising means for extracting channel specific data from the super channel layer by at least one of the network management process, bandwidth management process, load balancing process, session control process and QoS management process.

27. The system according to claim 26, further comprising means for sharing channel information acquired by each of the network management process, bandwidth management process, load balancing process, session control process and QoS management process among one or more of the network management process, bandwidth management process, load balancing process, session control process and QoS management process.

28. A system for providing enhanced connectivity in a multi-band, multi-protocol network, the system comprising:
at least one processor that:
combines a plurality of communication channels from one or more communication bands, the plurality of communication channels associated with a plurality of communication protocols, into a single protocol stack including a super channel layer and a MAC layer, the super channel layer above the MAC layer;
receives messages over a physical layer of the one or more communication bands and corresponding communication channels and aggregates the messages into the super channel layer; and
accesses the super channel layer to establish a communication session to transmit the aggregated messages.

29. The system according to claim 28, wherein the at least one processor further determines based on the aggregated messages, whether at least one of the communication channels, the one or more communication bands, and a combination of the communication channels and the one or more communication bands provides an optimal communication path for the communication session.

30. The system according to claim 29, wherein the at least one processor further selects at least one of the communication channels and one or more communication bands, and a combination of the communication channels and the communication bands to provide the communication session.

31. The system according to claim 30, wherein the super channel layer is a sublayer located within a data link layer.

32. The system according to claim 30, wherein the super channel layer is interfaced with the physical layer located below the MAC layer.

33. The system according to claim 28, wherein the at least one processor further monitors a portion of the aggregated messages in the super channel layer by at least one of a network management process, a bandwidth management process, a load balancing process, a session control process and a QoS management process.

34. The system according to claim 33, further comprising a network management process controller, bandwidth management process controller, load balancing process controller, session control process controller and QoS management interfaced with the super channel layer.

35. The system according to claim 34, wherein the management process controller, bandwidth management process controller, load balancing process controller, session control process controller and QoS management process controller further extract channel specific data from the super channel layer.

36. The system according to claim 35, wherein the management process controller, bandwidth management process controller, load balancing process controller, session control process controller and QoS management process controller further share channel information among one or more of a management process, bandwidth management process, load balancing process, session control process and QoS management process.

37. A system for providing enhanced connectivity in a multi-band, multi-protocol network, the system comprising:
at least one processor that:
forms a super channel layer above, and interfacing with, a plurality of MAC layers in a protocol stack, each MAC layer of the plurality of MAC layers associated with a different communication band, and each MAC layer of the plurality of MAC layers located above, and interfacing with, an individual physical layer of the communication band associated with the respective MAC layer;
receives messages over one or more of the physical layers and aggregates the messages into the super channel layer; and
accesses the super channel layer to establish a communication session to transmit the aggregated messages.

38. The system according to claim 37, wherein the super channel layer and the plurality of MAC layers are part of a data link layer.

39. The system according to claim 37, wherein the at least one processor further determines, based on the aggregated messages, whether at least one of the physical layers provides an optimal communication path for a communication session.

40. The system according to claim 39, wherein the at least one processor further selects at least one of the physical layers to provide the communication session.

41. The system according to claim 37, wherein the at least one processor further monitors a portion of the aggregated messages in the super channel layer by at least one of a network management process, a bandwidth management process, a load balancing process, a session control process and a QoS management process.

42. The system according to claim 41, wherein the at least one processor further interfaces at least one of the network management process, bandwidth management process, load balancing process, session control process and QoS management process with the super channel layer.

* * * * *